United States Patent [19]

Hofmann

[11] 3,930,375
[45] Jan. 6, 1976

[54] STORAGE VESSEL FOR LIQUEFIED GAS

[75] Inventor: Albert Hofmann, Grunwald, Germany

[73] Assignee: Linde Aktiengesellschaft, Wiesbaden, Germany

[22] Filed: Nov. 26, 1973

[21] Appl. No.: 418,853

[30] Foreign Application Priority Data
Nov. 27, 1972 Germany............ 2257984

[52] U.S. Cl............. 62/45; 220/9 LG; 220/9 C; 220/9 D
[51] Int. Cl.²......................... F17C 1/00
[58] Field of Search ............ 62/45, 50, 51; 220/9 C, 220/9L G, 9 D, 10; 114/74 A

[56] References Cited
UNITED STATES PATENTS

| | | | |
|---|---|---|---|
| 2,999,366 | 9/1961 | LaFave et al............. | 62/45 |
| 3,007,596 | 11/1961 | Matsch .................. | 62/45 X |
| 3,018,016 | 1/1962 | Hnilicka, Jr............. | 220/10 |
| 3,118,194 | 1/1964 | Biais..................... | 220/9 LG |
| 3,166,511 | 1/1965 | Matsch et al............. | 220/9 D |
| 3,256,000 | 6/1966 | Howlett, Jr............. | 220/9 A |
| 3,304,729 | 2/1967 | Chandler et al.......... | 62/45 |
| 3,559,835 | 2/1971 | Lange................... | 220/10 |
| 3,698,200 | 10/1972 | Johnson et al.......... | 62/45 |
| 3,699,696 | 10/1972 | Rhoton................. | 62/45 |

Primary Examiner—William F. O'Dea
Assistant Examiner—Ronald C. Capossela
Attorney, Agent, or Firm—Karl F. Ross; Herbert Dubno

[57] ABSTRACT

A storage vessel for liquefied gas, especially liquefied helium and liquefied hydrogen intended to be stored at temperatures below about 30°K, comprises inner and outer shells respectively at the liquefied-gas temperature and an ambient temperature, a radiation shield disposed between but spaced from the inner and outer shells and cooled by nitrogen or the like to a temperature between the storage temperature and ambient (preferably of the order of 70°K), a filling of a particulate insulating material between the radiation shield and the inner shell, and a filling composed of a mixture of such insulating particles and reflective metal particles between the outer shell and the radiation shield. The spaces between the inner and outer shells, respectively, and the radiation shield are evacuated and the insulating material is preferably perlite. The metal particles may be aluminum or copper.

3 Claims, 1 Drawing Figure

U.S. Patent    Jan. 6, 1976    3,930,375
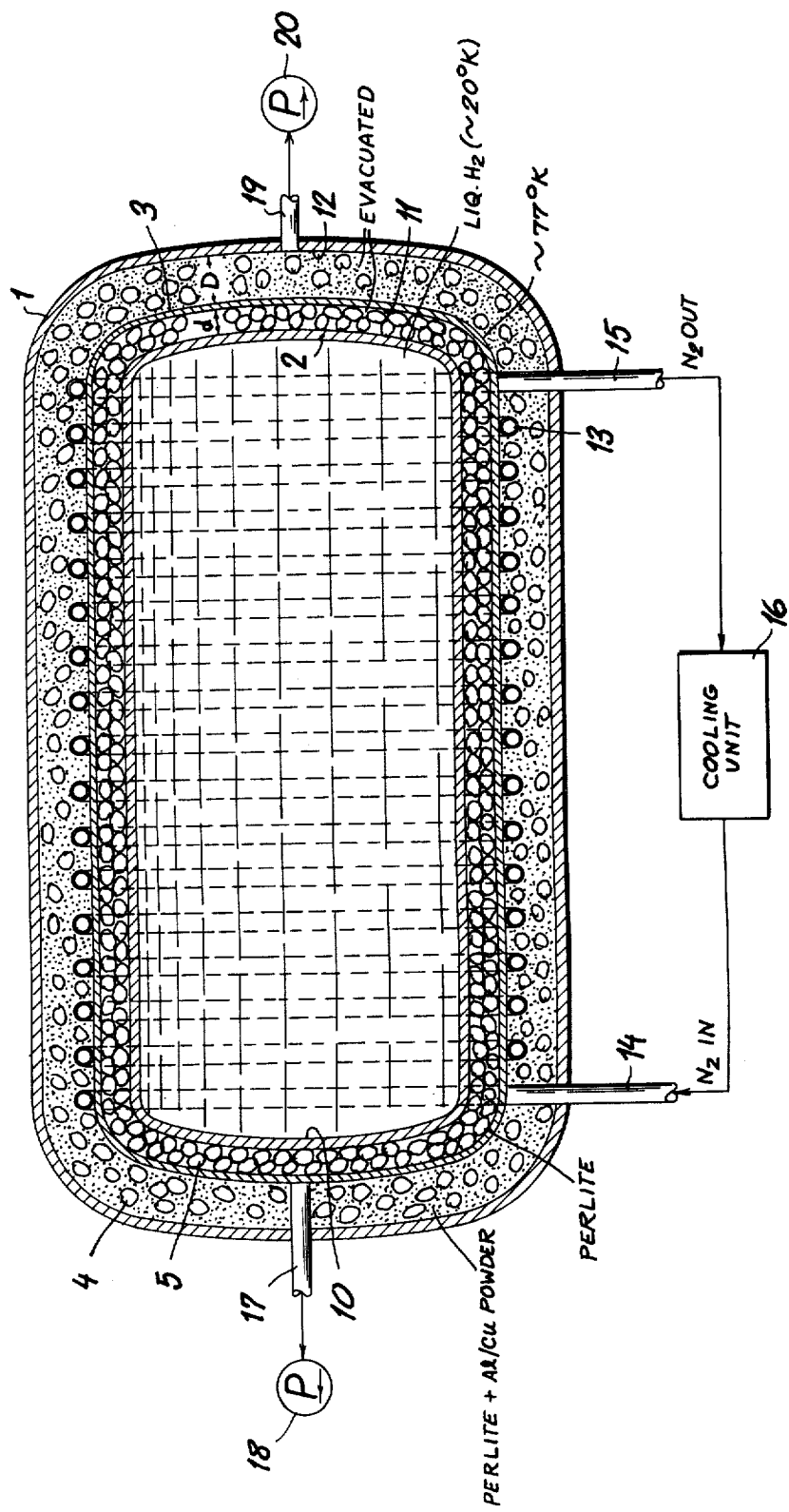

STORAGE VESSEL FOR LIQUEFIED GAS

FIELD OF THE INVENTION

The present invention relates to a storage vessel for low-temperature liquefied gases, especially hydrogen or helium adapted to be stored at temperatures below about 30°K at ambient or elevated pressure. More particularly, the invention relates to a receptacle of this character having an insulated space between inner and outer walls or shells of the receptacle.

BACKGROUND OF THE INVENTION

Double-wall vessels are commonly provided for the storage of low-temperature liquefied gases under pressure or at standard or ambient pressure, with suitable means for insulating the space between the two walls or shells of the vessel.

In an early version, such vessels were provided in accordance with Dewar principles and consisted of inner and outer shells or walls defining a space between them which was maintained under a high vacuum to prevent the development of convection currents tending to cause heat transfer from the outer wall to the inner wall or cold loss from the interior to the exterior. The or each wall could be provided with a highly reflective coating to prevent radiation transfer of energy between the interior and the exterior. Such systems had the obvious disadvantage that loss of the vacuum in the space between the two walls caused an immediate breakdown of the insulation space and substantial heat transfer between interior and exterior. Such heat transfer is disadvantageous for the storage of low-temperature liquefied gases at ambient pressure, causing substantially immediate vaporization of the liquefied gas.

It has been proposed to modify such systems for the storage of such liquefied gases as hydrogen and helium at temperatures below about 30°K by providing within the evacuated space between the two walls, a so-called superinsulation consisting of alternating layers of woven or nonwoven fabric web of low thermal conductivity and metal foil layers. The interstices of the fabric web further reduce convective flow of heat while the metal foil constitutes a reflection barrier to radiation transfer. While such systems are effective for the purposes stated, they are relatively expensive and difficult to manufacture and are highly sensitive to handling of the vessel. Furthermore, there is the disadvantage that leakage of the vacuum will occur and render the system ineffective. With gases such as hydrogen and helium even the slightest loss of insulating capacity can result in spontaneous vaporization of the stored liquid.

With the development of improved techniques for the storage, transport and utilization of liquefied gas, relatively low cost systems have been devised for insulating vessel and compartments containing the liquefied gas. One such system makes use of a filling of perlite, a porous insulator in the space between the two walls of a double wall vessel. This system, while effective for such relatively high-boiling liquefied gases as methane, are not suitable in the prior-art technique for use in the storage of hydrogen or helium in a liquid state because of thermal leakage and the effects of the heat capacity of the perlite.

OBJECTS OF THE INVENTION

It is the principal object of the present invention to provide a vessel for the storage and transport of low-temperature liquefied gases which obviates the disadvantages of the earlier systems as described.

Another object of the invention is to provide a storage vessel, especially for liquid hydrogen at ambient pressure which is of low cost and high effectiveness.

Still another object of the invention is the provision of a vessel for the storage of liquefied gases at temperatures of at most 30°K, which vessel is adapted to resist transfer of heat from the exterior to the interior to the extent necessary to maintain the stored liquid at a storage temperature for prolonged periods.

SUMMARY OF THE INVENTION

These objects and others which will become apparent hereinafter are obtained, in accordance with the present invention in a double-wall storage vessel for liquefied hydrogen or other liquefied gases, preferably liquids which must be maintained at temperatures below about 30°K, having an insulating system between inner and outer walls or shells which permits a safe and prolonged storage of the liquefied gases and minimizes evaporation losses of the stored medium from heat transfer thereto. This system comprises a continuous radiation shield, e. g. of a thermal reflecting sheet metal such as aluminum, which is disposed within the space between the inner and outer shells and is, in turn, spaced therefrom to define an inner compartment between the radiation shield and the outer shield.

In the inner compartment between the radiation shield and the inner shield, I provide a filling of pulverulent insulating material while in the outer compartment between the radiation shield and the outer shell, I provide a mixture of a pulverulent insulating material and a metal powder.

According to an important feature of the invention, the radiation shield is cooled by a low-temperature gas, e. g. nitrogen to a temperature between storage temperature and the ambient temperature, namely, a temperature between say 50°K and 150°K but preferably of the order of 70°K or 80°K.

The vessel has been found to have very low evaporation losses of the stored liquid (at a temperature of 30°K or below) since the transfer of heat from the exterior to the interior, whether by conduction or radiation, is substantially precluded.

To prevent the transfer of heat through the insulator by radiation, whose intensity falls with the fourth power of the temperature, there has been provided the reflective metal powder which is dispersed in the pulverulent insulating material within the outer compartment between the outer shell and the radiation shield, i. e. in the warm region of the insulation. Any radiation which is not reflected by the metal powder is intercepted by the cooled radiation shield. Preferably the cooling is carried out by means of deep, cooled nitrogen.

Thermal conduction is precluded by the low conductivity pulverulent insulating material within the outer compartment between the outer shell and the radiation shield. Conduction is completely prevented between the radiation shield and the inner shell by the pulverulent insulating material completely filling the space there between. The effectiveness of the system will be apparent from the fact that, within the inner compartment, no reflecting material is necessary.

Best results have been obtained with respect to excluding radiation transfer of heat when the metal powder makes up 15 to 30 percent by weight, preferably 18 to 25 percent by weight of the filling mixture introduced into the outer compartment. The pulverulent insulating material is a porous or cellular mineral substance, most advantageously perlite, which the metal powder is composed of aluminum or copper.

The two compartments are evacuated and it has been found to be advantageous to space the radiation shield more closely to the inner shell than to the outer shell. Best results have been obtained when the distance between the radiation shield and the outer shell and the distance between the radiation shield and the outer shell and the distance between the radiation shield and the inner shell are in a ratio of 2:1. With this arrangement heat transfer through the system has been found to be a minimum.

DESCRIPTION OF THE DRAWING

The above and other objects, features and advantages of the present invention will become more readily apparent from the following description, reference being made to the accompanying drawing in which the sole FIGURE represents, in cross section, in a storage vessel embodying the principles of the present invention.

SPECIFIC DESCRIPTION

In the drawing, there has been shown a storage vessel for liquefied hydrogen which comprises an outer shell 1 and an inner shell 2 defining a space between them. Liquid hydrogen is introduced into and removed from the storage compartment 10 of the inner shell 2 by appropriate fitting not illustrated. The outer shell 1 may be considered to be at a temperature of about 300°K (ambient temperature) while the temperature of the shell 2 is the same as that of the stored liquid hydrogen, in this case about 20°K.

Within the space between the outer shell 1 and the inner shell 2, there is provided a radiation shield 3, e. g. of polished aluminum sheet metal, which completely surrounds the inner shell 2 and defines therewith an inner compartment 11. The space between the radiation shell 3 and the outer shell is defined as an outer compartment represented at 12. The radiation shield 3 is welded to a tube coil 13 in heat-transferring relationship therewith and to which nitrogen can be fed via a line 14 and removed by line 15. A cooling unit 16 of conventional design is provided for supplying the deep-cooled nitrogen. The temperature of the radiation shield is of the order of 70°K, in the present case about 77°K. The distance D between the radiation shield and the outer shell 1 and the distance between the radiation shield and the inner shell are in a ratio of 2:1. The inner space of compartment 11 is completely filled with pulverulent perlite in a particle size between 50 microns and 5 millimeters as represented at 5 while the outer space 12 is filled with 80 percent by weight of the perlite and 20 percent by weight of aluminum particles having a particle size from 5 microns to 500 microns as represented at 4. The inner compartment is evacuated via a fitting 17 and a suction pump 18 while the outer compartment is evacuated via a pipe 19 and a suction pump 20.

The tubes 13 are disposed with the outer compartment 12 while the vacuum pumps 18 and 20 are designed to create a vacuum of about 10-5 torr within the compartment.

I claim:
1. A storage vessel for a liquid adapted to be maintained normally at a temperature below about 30°K, said vessel comprising:
   an inner shell defining a chamber receiving said liquid;
   a radiation shield specedly surrounding said inner shell and defining an inner compartment therewith;
   an outer shell spacedly surrounding said radiation shield and defining an outer compartment with said radiation shield;
   a mass consisting of pulverulent insulating material free from metal particles filling said inner compartment;
   a mixture of pulverulent insulating material and metal powder filling said outer compartment, the proportion of metal powder in said mixture being substantially 15 to 30 percent by weight, said insulating material being perlite and said metal powder being aluminum or copper;
   means for cooling said radiation shield and including tubes lying in said outer compartment and extending along and in heat-exchanging relationship with said radiation shield, and means for passing a deep-cooled fluid through said tubes, the distance between said outer shell and said radiation shield and the distance between said radiation shield and said inner shell being in a ratio of about 2:1;
   means for evacuating said inner compartment; and
   means for exacuating said outer compartment.

2. The storage vessel defined in claim 1 wherein said proportion is 18 to 25 percent by weight.

3. The storage vessel defined in claim 1 wherein said means for passing a deep-cooled fluid through said tubes includes means for supplying nitrogen at a temperature of 50°K to 150°K to said tubes.

* * * * *